United States Patent [19]

Anderson

[11] Patent Number: 4,480,253

[45] Date of Patent: Oct. 30, 1984

[54] WRIST WATCH WEATHER RADIO

[76] Inventor: Howard M. Anderson, 325 Highland Ave., West Newton, Mass. 02165

[21] Appl. No.: 500,005

[22] Filed: Jun. 1, 1983

[51] Int. Cl.³ .......................... H04Q 7/02; H04B 1/16
[52] U.S. Cl. .......................... 340/825.69; 340/825.44;
340/815.04; 455/228; 455/351; 381/51
[58] Field of Search ............... 455/156, 227, 228, 344,
455/351; 340/539, 756, 811, 825.69, 815.04,
825.44; 381/51; 375/75

[56] References Cited

U.S. PATENT DOCUMENTS

| 3,478,344 | 11/1969 | Schwitzgebel et al. | 340/825.44 |
| 3,937,004 | 2/1976 | Natori et al. | 455/344 |
| 3,976,995 | 8/1976 | Sebestyen | 455/344 |
| 4,392,246 | 7/1983 | Niioka et al. | 455/156 |
| 4,419,770 | 12/1983 | Yagi et al. | 455/351 |

FOREIGN PATENT DOCUMENTS

| 16903 | 2/1977 | Japan | 455/227 |
| 2078468 | 1/1982 | United Kingdom | 340/825.69 |

*Primary Examiner*—Jin F. Ng
*Attorney, Agent, or Firm*—Louis Orenbuch; David Wolf

[57] ABSTRACT

A miniature radio receiver for receiving coded radio transmissions pertaining to the actual or predicted state of the weather and storing the information in a memory from which information can be read out on command. In one embodiment, the radio is small enough to be attached to the wrist and has a display face on which information pertaining to the weather is presented. In another embodiment, the receiver is provided with a voice synthesizer which responds to a read out command by audibly announcing the weather information stored in the memory.

3 Claims, 6 Drawing Figures

WRIST WATCH WEATHER RADIO

This invention relates in general to a device employing a miniature radio receiver for receiving and storing information relating to the weather. More particularly, the invention pertains to a device for receiving coded radio transmissions pertaining to the actual or predicted state of the weather and storing the information in a memory from which information can be read out on demand.

In the preferred embodiment of the invention, the device is made in a form somewhat like a wrist watch. The device of the preferred embodiment is small enough to be attached to the wrist and has a display face on which information pertaining to the weather is presented. In another embodiment of the invention, the device is provided with a voice synthesizer which responds to a read out command by audibly announcing the weather information stored in the memory.

THE DRAWINGS

Figure 1:
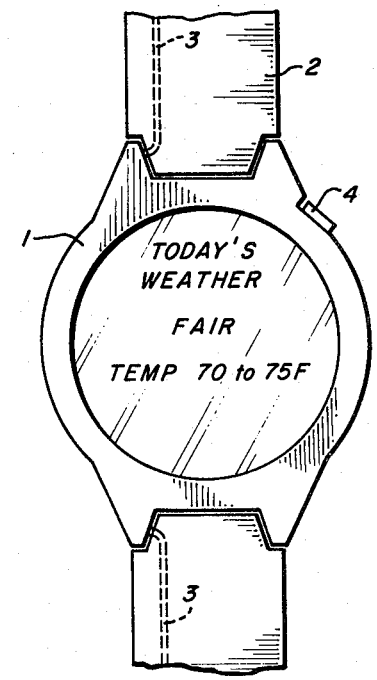
FIG. 1 is a top plan view of the preferred embodiment of the invention.

Referring now to FIG. 1 of the drawings, there is shown a housing 1 in the form of a wrist watch casing having an attached wrist band 2 in which a loop antena 3 is imbedded. Leads from the loop antenna extend into the housing 1 and that antenna provides radio signals to a miniature fm radio receiver situated in the housing. Preferably, the fm radio receiver is tuned to a single fm channel which broadcasts weather information for the local area. In the housing is disposed display means of the kind now conventionally used in wrist watches to present the time in digital form. For convenience that type of display is here termed an alpha-numeric display. A typical display, as shown in FIG. 1, may show under "Today's Weather" the term "FAIR" and thereunder "Temp 70° to 75° F.". Protruding from the housing is a button 4 which upon being depressed once causes the display to present the forecast for tomorrow's weather.

Figure 2:
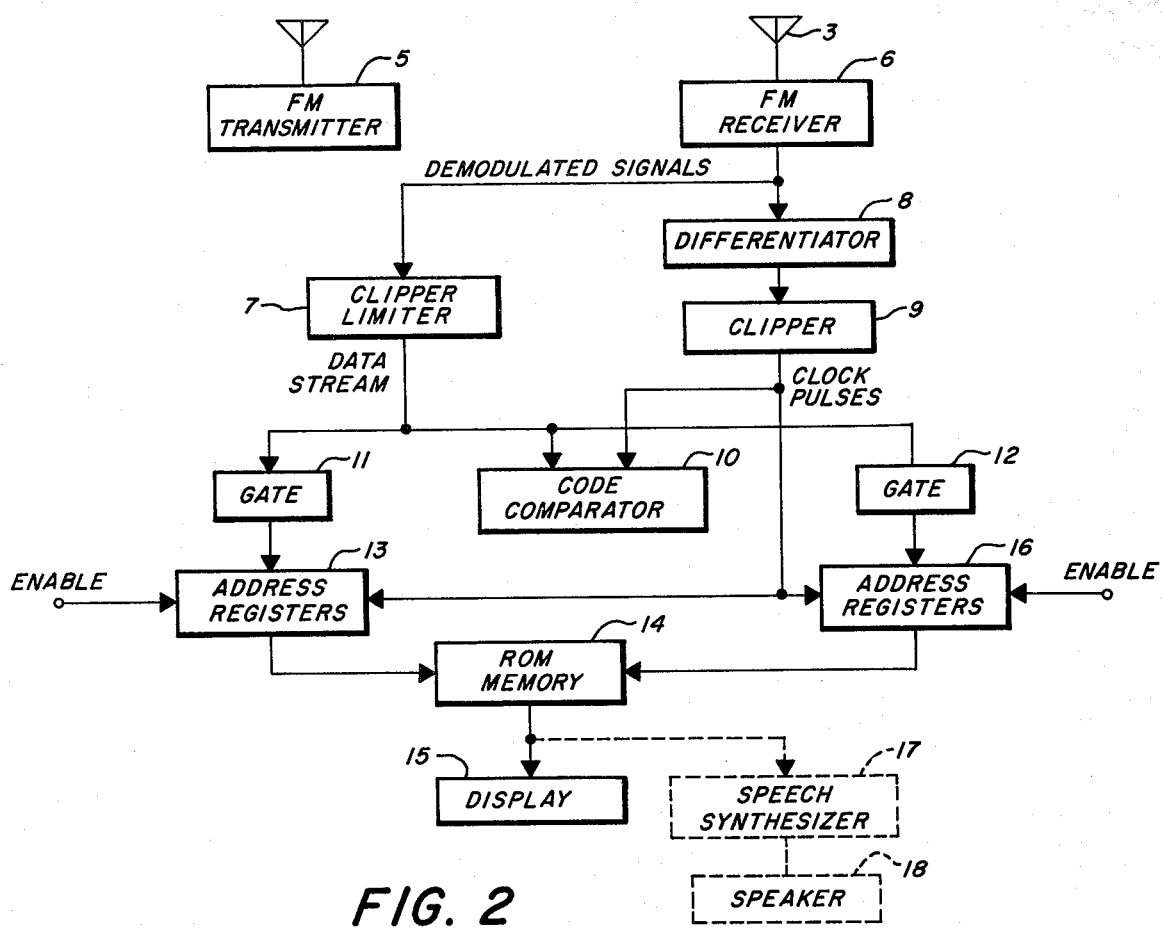
FIG. 2 is a block diagram showing the scheme of the invention.

Referring now to FIG. 2 of the drawings, the scheme of the invention is shown in block diagram form. The fm transmitter 5 transmits digitally coded fm signals containing information about the actual or predicted state of the weather. Preferably, the information about today's weather is preceded by one sequence of digital signals and the information about tomorrow's weather is preceded by a different sequence of digital signals. The fm transmitter can be of a kind now known in the radio transmission art.

The transmitted fm radio waves impinge upon the loop antenna 3 and induce signals in that antenna which are detected and demodulated by the fm radio receiver 6 in the housing 1. The output of that receiver is a sequence of pulses, as shown in FIG. 3A.

Figure 3A:
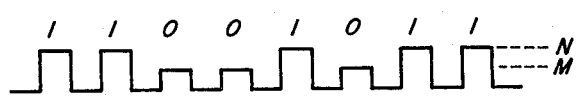
FIGS. 3A to 3D are waveforms occurring in the operation of the invention.
Figure 3B:

Pulses whose amplitudes are above the "M" level in FIG. 3A are "1" bits whereas pulses whose amplitudes are below the "M" level are "0" bits. Consequently the demodulated stream of pulses constitute binary digital signals. The pulse sequence of FIG. 3A is fed into a clipper-limiter 7 that emits a pulse, as shown in FIG. 3B, for each binary digital signal whose amplitude is above the "M" level. Where the binary digital signal is greater than the "N" level, the clipper-limiter emits a pulse of constant amplitude. It is preferred to have the amplitude of the "1" pulses somewhat greater than the "N" level to obtain "1" bits of uniform amplitude, as shown in FIG. 3B.

Figure 3C:
Figure 3D:
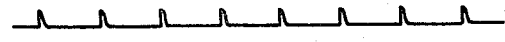

The demodulated pulses from the output of the fm receiver are also fed into a differentiator 8 to obtain the positive and negative going spikes shown in FIG. 3C. The positive going spikes are derived from the leading edges of the pulses whereas the negative going spikes are derived from the trailing edges of those pulses. The negative going spikes are eliminated and only the positive going spikes are fed from the differentiator 8 into the clipper 9. The output of the clipper is a train of clock pulses, shown in FIG. 30, which is in synchronism with the data bit stream (FIG. 3B) outputted from the clipper-limiter 9.

The stream of serial data bits is clocked by the clock pulses into a code comparator where it is compared with code patterns representing the code for "today's weather" and the code for "tomorrow's weather". Those code patterns for example can consist of ten bits arranged in designated "1" and "0" sequences. Upon the occurrence of matching code patterns, the code comparator emits an enabling signal to gate 11 if the matching pattern is for "today's weather" or emits an enabling signal to gate 12 if the matching pattern is for "tomorrow's weather". Assuming gate 11 is enabled by the code comparator, the data bits thereupon pass through that gate and are clocked into the address registers 13. For ease of exposition, it is assumed that each address has eight bits which corresponds with the address of weather information previously stored in the read only ROM memory 14. The information stored in the ROM memory corresponds to weather information items such as "rain", "snow", "cloudy", "clear", "sunny", "drizzle", "cold", "freezing", "overcast", "wind velocity", "breeze", "gale", stormy, etc. In addition, stored in the ROM memory are bits representing decimal digits whereby the display can present temperature information in the Celsius scale or in the Fahrenheit scale. When the address registers 13 are enabled, those registers cause the ROM memory to read out signals to the display 15 which cause that display, for example, to show under "Today's Weather" the word "FAIR" and thereunder "Temp 70° to 75° F.".

Following the entry in the address registers of the information pertaining to today's weather, the fm receiver 6 may, for example, receive a transmission concerning tomorrow's weather. That transmission would be identified by the code for tomorrow's weather. Code comparator 10, upon reception of the code pattern for tomorrow's weather would thereupon emit an enabling signal to gate 12. The data, representing the forecast for tomorrow's weather, then pass through gate 12 into address registers 1. Upon being enabled, the outputs of the address registers 1 cause the information at the designated addresses to be read out to the display 15.

The enable signals for the address registers can be generated in a conventional manner by pressing the button 4 once to display "today's weather" or pressing the button twice in quick succession to display "tomorrow's weather".

In addition to having the weather information shown on the display, a speech synthesizer 17 and a speaker 18 can be arranged, as indicated by the broken lines in FIG. 2, to audibly announce the weather report. If a visual display is not desired, the display device 15 can be eliminated and the ROM memory will then control only the speech synthesizer 17.

I claim:

1. A portable device for presenting information on the state of the weather comprising
   (a) a radio receiver for receiving binary coded radio signals;
   (b) means for deriving a stream of data signals from the coded radio signals,
   (c) means for deriving clock pulses from the received radio signals, the clock pulses being synchronous with the bits in the stream of data signals,
   (d) first and second gates, the data stream being applied as the input to both gates,
   (e) a code comparator for comparing the data signals with bit patterns representing today's weather and tomorrow's weather, the code comparator emitting an enable signal to the first gate upon the occurrence of a match with the pattern representing today's weather and emitting an enable signal to the second gate upon the occurrence of a match with the pattern representing tomorrow's weather,
   (f) first address registers, the output of the first gate providing the input to the first address registers,
   (g) second address registers, the output of the second gate providing the input to the second address registers,
   (h) a read only memory having information pertaining to different weather states stored at predetermined addresses, the outputs of the first and second address registers providing the input to the read only memory, and
   (i) means responsive to the output of the read only memory for providing information on the state of the weather.

2. The portable device according to claim 1 wherein the means for presenting information on the state of the weather is a visual display device.

3. The portable device according to claim 1 wherein the means for presenting information on the state of the weather includes a speech synthesizer and speaker.

* * * * *